United States Patent [19]

Mayeaux

[11] Patent Number: 5,476,586
[45] Date of Patent: Dec. 19, 1995

[54] HOUSING FOR SHEET OF PHASE-SEPARATING MATERIAL

[75] Inventor: Donald P. Mayeaux, Prairieville, La.

[73] Assignee: A+ Corp, Prairieville, La.

[21] Appl. No.: 366,263

[22] Filed: Dec. 29, 1994

[51] Int. Cl.$^6$ .......................... B01D 27/00; B01D 63/00
[52] U.S. Cl. .......................... 210/446; 210/232; 210/455; 210/456; 210/321.75; 55/510; 55/511
[58] Field of Search .......................... 210/321.72, 321.75, 210/321.84, 433.1, 446, 227, 231, 456, 232, 455; 55/510, 511; 604/406

[56] References Cited

U.S. PATENT DOCUMENTS

| | | | |
|---|---|---|---|
| 3,386,585 | 6/1968 | Weyand et al. | 210/446 |
| 3,817,377 | 6/1976 | Piggott | 210/433.1 |
| 3,935,111 | 1/1976 | Bentley | 210/446 |
| 3,967,620 | 7/1976 | Noiles | 210/446 |
| 4,113,627 | 9/1978 | Leason | 210/446 |
| 4,136,029 | 1/1979 | Cosack et al. | 210/321.84 |
| 4,874,513 | 10/1989 | Chakraborty et al. | 210/455 |
| 4,935,002 | 6/1990 | Gordon | 210/645 |
| 5,230,727 | 7/1993 | Pound et al. | 210/446 |
| 5,269,917 | 12/1993 | Stankowski | 210/321.75 |
| 5,415,781 | 5/1995 | Randhahn | 210/321.75 |

Primary Examiner—Ana M. Fortuna
Attorney, Agent, or Firm—Reginald F. Roberts, Jr.

[57] ABSTRACT

A housing for a sheet of phase-separating material. The housing has first and second plates which hold the sheet between their interior surfaces. The first plate has a circular central opening and a peripheral opening. On the interior surface of the first plate are several concentric channels. The second plate has a circular central opening which is coaxial with the central opening in the first plate. The central opening in the first plate serves as an inlet port for a multiphase feed stream. The central opening in the second plate serves as an outlet port for one of the phases of the feed stream. The peripheral opening in the first plate serves as a bypass port for the feed stream, or as an outlet for a second phase of the feed stream.

36 Claims, 2 Drawing Sheets 5,476,586

HOUSING FOR SHEET OF PHASE-SEPARATING MATERIAL

BACKGROUND OF THE INVENTION

The present invention relates to the physical separation of a multiphase stream into its component phases. More particularly, the invention relates to a housing for a sheet of phase-separating material.

It is frequently important during the filtration of a fluid to bring the fluid into intimate contact with the surface of the filter medium. This is particularly true when a membrane separator is employed. A membrane separator can function in a manner that filters out particulates, separates liquids from gases, and in some cases separates immiscible liquids from one another.

Under any circumstances it is always very important that the fluid contact the entire available surface of the filter medium or the membrane. A common technique employed, particularly in analytical applications, is to have the fluid enter a housing, and have a portion of the fluid entering the housing bypass the filter medium. This procedure is followed in order to decrease the transport time, and to purge incoming sample lines. This procedure also serves in many cases to remove some of the materials that were separated from the incoming fluid by the filter medium. This is particularly so in membrane separators in which liquids are rejected by the membrane and are swept out with the bypass stream.

It is also possible to remove particulates continuously as they accumulate on the surface of the filter medium or membrane. The filtrate leaves the housing through an outlet port. In the case of analyzers, the sample is taken through perhaps further conditioning before being sent to an analyzer.

It is very important, particularly when particles accumulate on the surface of the membrane or filter medium, to have a high velocity of the fluid perpendicular to the surface of the membrane or filter medium, in order to remove particles that might accumulate thereon. There are in the prior art filtration devices which attempt to accomplish this objective by bringing the fluid sample into an inlet of a housing tangentially, thereby giving the fluid a centrifugal or swirling motion that is perpendicular to the filter medium or membrane. The problem with this approach is that there is no assurance that the fluid is effectively shearing across the entire surface of the membrane or filter medium.

There are other instances in which the objective of bringing the fluid into a membrane separator housing is to separate liquids from an entrained gas, or to separate immiscible liquids, or to recover a gas that is dissolved or dispersed in the incoming liquid. In all of these cases, it is also very important that the entire membrane area be exposed to the fluid sample, and conversely that the entire fluid sample be exposed to the surface of the membrane to ensure, particularly in the case of a gas dispersed or dissolved in a liquid, that all of the fluid contact the membrane, in order that the gas pass through the membrane and thereby become separated from the liquid phase. After the liquid contacts the membrane, it is usually rejected and vented.

SUMMARY OF THE INVENTION

In general, the present invention provides a housing for a sheet of phase-separating material. The housing comprises a planar first plate and a planar second plate constructed and arranged to hold the sheet between the interior surfaces of the first and second plates in a parallel configuration. The first plate has a circular central first opening extending therethrough, and a peripheral second opening which extends through the perimeter of the first plate.

The first plate includes on its interior surface a plurality of concentric channels. A first circular channel is concentric with and circumscribes the central first opening. The first channel comprises a first circular ridge and a third opening which includes a second circular ridge continuous with the first circular ridge. A second circular channel is concentric with and circumscribes the first circular channel. The second channel comprises the first circular ridge, a third circular ridge, and a fourth opening which includes a fourth circular ridge continuous with the third circular ridge. A third circular channel is concentric with and circumscribes the second circular channel. The third channel comprises the third circular ridge, a fifth circular ridge, and a fifth opening which includes a sixth circular ridge continuous with the fifth circular ridge.

A fourth circular channel is concentric with and circumscribes the third channel. The fourth channel comprises the fifth circular ridge, a raised surface circumscribing the third channel, and the peripheral second opening.

The first, third, and fifth circular ridges, and the raised surface are higher than the second, fourth, and sixth circular ridges.

The second plate has a circular central sixth opening which extends therethrough. The central sixth opening in the second plate is coaxial with and juxtaposed to the central first opening in the first plate when the first and second plates are assembled to hold the sheet therebetween.

DETAILED DESCRIPTION OF THE INVENTION

Figure 1:
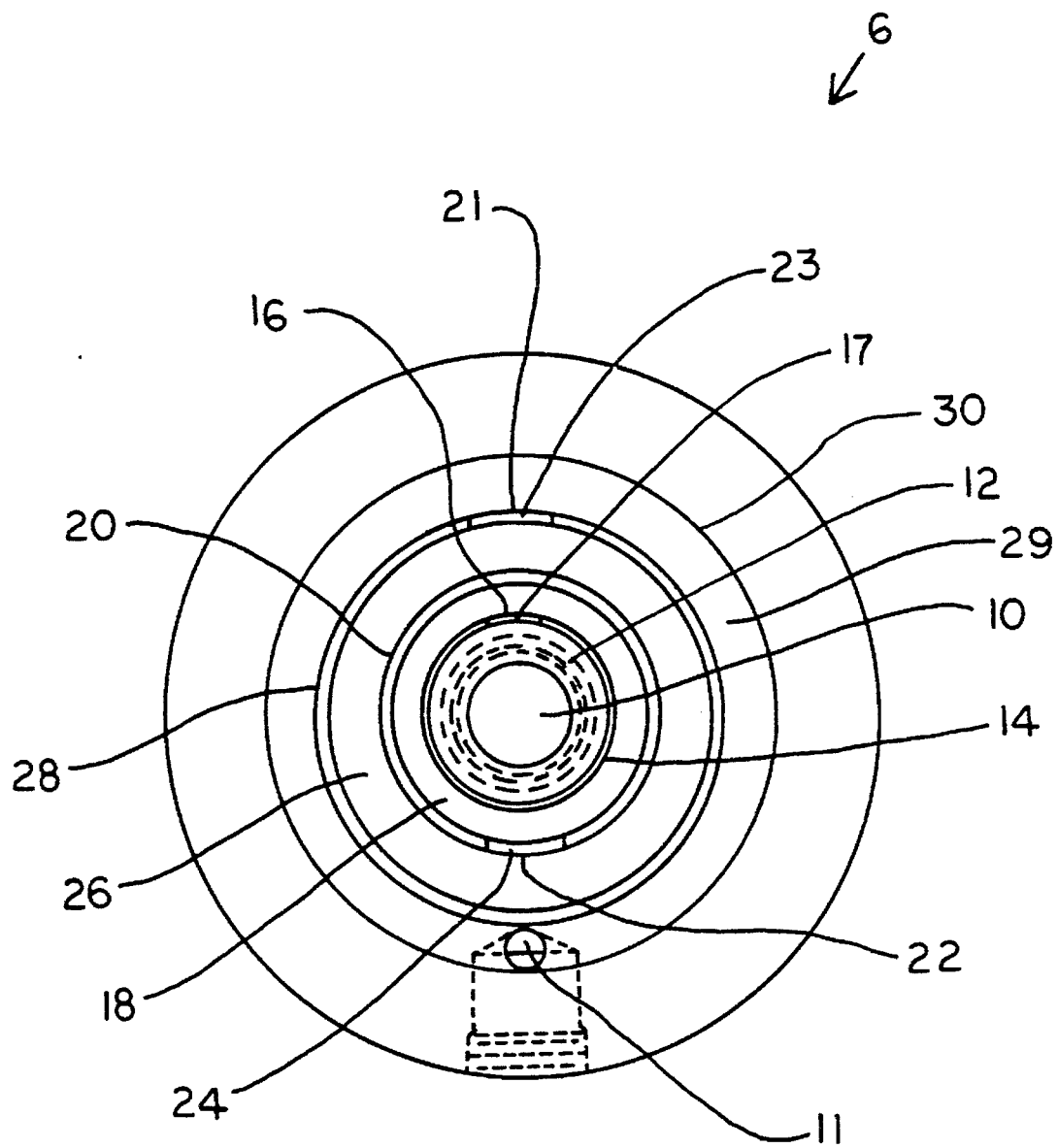
FIG. 1 is a plan view of the interior surface of one of two plates of a housing for a sheet of phase-separating material, made in accordance with the principles of the present invention.
Figure 2:
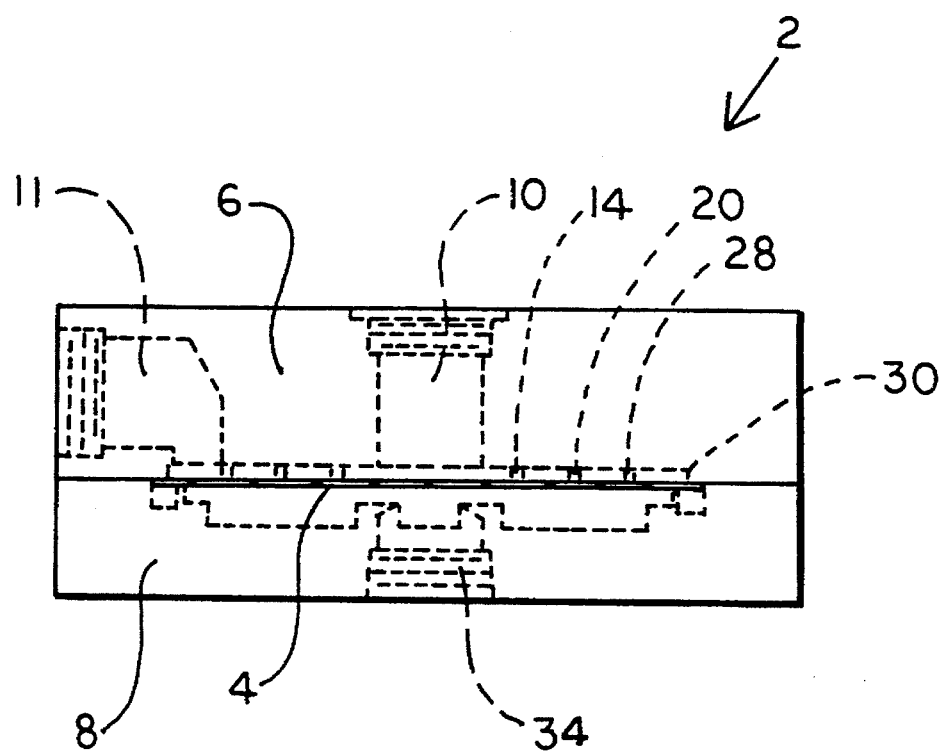
FIG. 2 is a side view of the housing, showing the two plates assembled, with the sheet held therebetween.
Figure 3:
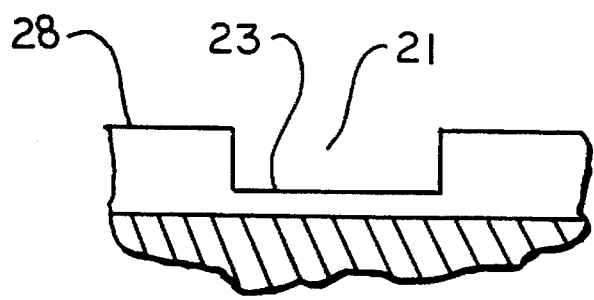
FIG. 3 is a side view of the plate shown in FIG. 1.

More specifically, reference is made to FIGS. 1–3, in which is shown a housing, generally designated by the numeral 2, for a sheet 4 of phase-separating material, made in accordance with the principles of the present invention.

The housing 2 comprises a first plate 6 and a second plate 8. The first and second plates 6 and 8 are constructed and arranged to hold the sheet 4 between their interior surfaces when the housing 2 is assembled. The plates 6 and 8 are held together by bolts (not shown) disposed in holes (not shown) in the peripheries of the first and second plates 6 and 8. An O-ring (not shown) disposed in a groove (not shown) in the second plate 8 circumscribes the sheet 4. The O-ring is preferably made from an elastomeric material.

The first plate 6 has a circular central first opening 10 and a peripheral second opening 11. The plate 6 includes on its interior surface a plurality of concentric circular channels 12, 18, 26, and 29.

A first circular channel 12 is concentric with and circumscribes the central opening 10. The first channel 12 comprises a first circular ridge 14 and a third opening 16 which includes a second circular ridge 17 continuous with the first circular ridge 14. The first circular ridge 14 rises above the second circular ridge 17. The second circular ridge 17 and the third opening 16 are disposed between first and second ends of the first circular ridge 14, the first circular ridge 14 and the second circular ridge 17 in combination defining a complete circle.

A second circular channel 18 is concentric with and circumscribes the first circular channel 12. The second channel 18 comprises the first circular ridge 14, the second circular ridge 17, a third circular ridge 20, and a fourth opening 22 which includes a fourth circular ridge 24. The third circular ridge 20 rises above and is contiguous with the fourth circular ridge 24. The fourth circular ridge 24 and the fourth opening 22 are disposed between first and second ends of the third circular ridge 20, the third circular ridge 20 and the fourth circular ridge 24 in combination defining a complete circle. The first circular ridge 14 and the second circular ridge 17 in combination define the inner boundary of the second circular channel 18. The third circular ridge 20 and the fourth circular ridge 24 in combination define the outer boundary of the second circular channel 18.

A third circular channel 26 is concentric with and circumscribes the second channel 18. The third channel 26 comprises the third circular ridge 20 the fourth circular ridge 24, a fifth circular ridge 28, and a fifth opening 21 which includes a sixth circular ridge 23 The fifth circular ridge 28 rises above and is contiguous with the sixth circular ridge 23. The sixth circular ridge 23 and the fifth opening 21 are disposed between first and second ends of the fifth circular ridge 28, the fifth circular ridge 28 and the sixth circular ridge 23 in combination defining a complete circle. The third circular ridge 20 and the fourth circular ridge 24 in combination define the inner boundary of the third circular channel 26. The fifth circular ridge 28 and the sixth circular ridge 23 in combination define the outer boundary of the third circular channel 26.

A fourth circular channel 29 is concentric with and circumscribes the third channel 26. The fourth channel 29 comprises the fifth circular ridge 28 the sixth circular ridge 23, a raised surface 30, and the peripheral second opening 11. The raised surface 30 rises above and is contiguous with the lower planar surface of the first plate 6. The fifth circular ridge 28 and the sixth circular ridge 23 in combination define the inner boundary of the fourth circular channel 29. The raised surface 30 defines the outer boundary of the fourth circular channel 29.

Preferably, the openings 16, 22, 21, and 11, and the ridges 17, 24, and 23 are disposed at intervals of from about one-hundred-seventy degrees to about one-hundred-ninety degrees around the central opening 10. Even more preferably, the openings 16, 22, 21 and 11, and the ridges 17, 24, and 23 are disposed at intervals of approximately one-hundred-eighty degrees around the central opening 10.

Preferably, the central opening 10 functions as an inlet port for a multiphase feed stream to the phase-separating device comprising the housing 2 and sheet 4. In the preferred embodiment of the present invention, the peripheral opening 11 functions as a bypass port for the feed stream, or as an outlet port for one phase of the feed stream.

In an alternative embodiment, the peripheral opening 11 functions as an inlet port for the multiphase feed stream, and the central opening 10 functions as a bypass port for the feed stream or as an outlet port for one phase of the feed stream.

A central sixth opening 34 in the second plate 8 extends through the second plate 8, and functions as an outlet port for the housing 2. The central sixth opening 34 in the second plate 8 conducts one phase of the multiphase feed stream out of the housing 2. The central sixth opening 34 in the second plate 8 is coaxial with and juxtaposed to the central first opening 10 in the first plate 6 when the first and second plates 6 and 8 are assembled to hold the sheet 4 therebetween.

Preferably, each of the first, second, third, and fourth channels 12, 18, 26, and 29 has a width of from about one-tenth inch to about one-half inch. Even more preferably, each of the first, second, third, and fourth channels 12, 18, 26, and 29 has a width of from about one-tenth to about four-tenths of an inch. Even more preferably, each of the channels 12, 18, 26, and 29 has a width of from about one-tenth to about three-tenths of an inch. Most preferably, each of the channels 12, 18, 26, and 29 has a width of approximately two-tenths of an inch.

Preferably, each of the ridges 14, 20, and 28, and the raised surface 30 have a height of from about one one-hundredth of an inch to about twelve one-hundredths of an inch. Even more preferably, each of the ridges 14, 20, and 28, and the raised surface 30 have a height of from about two one-hundredths to about one-tenth of an inch. Even more preferably, each of the ridges 14, 20, and 28, and the raised surface 30 have a height of from about three one-hundredths to about nine one-hundredths of an inch. Even more preferably, each of the ridges 14, 20, and 28, and the raised surface 30 have a height of from about four one-hundredths to about eight one-hundredths of an inch. Even more preferably, each of the ridges 14, 20, and 28, and the raised surface 30 have a height of from about five one-hundredths to about seven one-hundredths of an inch. Most preferably, each of the ridges 14, 20, and 28, and the raised surface 30 have a height of approximately sixty-three one-thousandths of an inch.

Preferably, each of the openings 16, 22, and 21, and each of the ridges 17, 24, and 23 have a length from about one-tenth to about six-tenths of an inch. Even more preferably, each of the openings 16, 22, and 21, and each of the ridges 17, and 23 has a length of from about two-tenths to about five-tenths of an inch. Even more preferably, each of the openings 16, 22, and 21, and each of the ridges 17, 24, and 23 have a length of from about three-tenths to about five-tenths of an inch. Even more preferably, each of the openings 16, 22, and 21, and each of the ridges 17, 24, and 23 have a length of from about four-tenths to about five-tenths of an inch. Most preferably, each of the openings 16, 22, and 21, and each of the ridges 17, 24, and 23 have a circumference of approximately forty-four one-thousandths of an inch.

Preferably, each of the ridges 17, 24, and 23 has a height of from about five one-thousandths to about five one-hundredths of an inch. Even more preferably, each of the ridges 17, 24, and 23 has a height of from about five one-thousandths to about four one-hundredths of an inch. Even more preferably, each of the ridges 17, and 23 has a height of from about five one-thousandths to about three one-hundredths of an inch. Even more preferably, each of the ridges 17, 24, and 23 has a height of from about five one-thousandths to about two one-hundredths of an inch. Even more preferably, each of the ridges 17, 24, and 23 has a height of from about five one-thousandths to about one one-hundredth of an inch. Most preferably, each of the ridges 17, 24, and 23 has a height of approximately nine one-thousandths of an inch.

It is to be noted and emphasized that, while the permissible ranges of heights of the ridges 14, 20, and 28, and the raised surface 30 generally overlap the permissible ranges of heights for the ridges 17, 24, and 23, it is critical and necessary, for each individual housing 2, that the ridges 14, 20, and 28, and the raised surface 30 be higher than the ridges 17, 24, and 23, in order to confine the fluid to the channels 12, 18, 26, and 29. Preferably, for each individual housing 2, the ridges 14, 20, and 28, and the raised surface 30 are substantially higher than the ridges 17, 24, and 23. The heights of the ridges 14, 20, 28, 17, 24, and 23 and the height of the raised surface 30 are defined as elevations above the lower planar interior surface of the first plate 6, as one looks down upon the interior surface of the plate 6 as shown in FIG. 1.

Preferably, each of the ridges 14, 20, and 28 defines an arc of from about two-hundred-eighty degrees to about three-hundred-twenty degrees, and each of the ridges 17, 24, and 23 defines an arc of from about forty degrees to about eighty degrees. Most preferably, each of the ridges 14, 20, and 28 defines an arc of approximately three-hundred degrees, and each of the ridges 17, 24, and 23 defines an arc of approximately sixty degrees.

Preferably, the distance between the sheet 4 and the most elevated areas of the interior surface of each of the plates 6 and 8 is from about one one-thousandth to about five one-hundredths of an inch. Even more preferably, this distance is from about one one-thousandth to about four one-hundredths of an inch. Even more preferably, the distance is from about one one-thousandth to about three one-hundredths of an inch. Even more preferably, the distance is from about one one-thousandth to about two one-hundredths of an inch. Even more preferably, the distance is from about one one-thousandth to about one one-hundredth of an inch. Most preferably, the distance separating the sheet 4 from the most elevated areas of the interior surface of each of the plates 6 and 8 is approximately eighteen one-thousandths of an inch.

The assembled housing 2 and sheet 4 provide a device for separating a multiphase feed stream into its component phases. For example, the sheet 4 may be a filter paper or filter leaf, and the multiphase feed stream may comprise a suspension of a solid phase in a liquid phase. Alternatively, the sheet 4 may be a membrane capable of separating two immiscible liquid phases. A third type of feed stream is represented by gas and liquid phases, in which case the sheet 4 would be a membrane capable of separating the gas and liquid phases.

The present invention accomplishes several objectives. First of all, it ensures that the fluid brought into the housing 2 will be made to contact the entire surface of the membrane or filter medium 4. It also ensures that all of the fluid will contact totally and completely the surface of the sheet 4. Further, this is accomplished with a low volumetric flow rate, which provides a high linear flow velocity because of the internal geometry of the housing 2.

The housing 2 provides this contact by bringing the fluid as a very thin sheet in a disruptive or a continuously-changing circular motion that produces an enormous amount of turbulence.

In the preferred embodiment of the present invention incoming fluid enters the housing 2 through the central opening 10 in the first plate 6. This provides a path for the fluid in two directions which are one-hundred-eighty degrees apart. The fluid enters the second channel 18 through the opening 16 between the first and second channels 12 and 18, respectively, where the stream splits and flows in opposite directions, to reunite and reenter the third channel 26 through the opening 22 between the channels; then, in a continuing manner, makes its way to the outside circumference of the raised surface 30 of the first plate 6 of the housing 2 by going into the fourth channel 29. Eventually, as the streams get to the edge of the housing 2, they have contacted all of the surface of the sheet 4.

Additionally, the openings between adjacent channels include ridges which create enormous turbulence in the fluid stream. Additional turbulence is created by the very sharp edges of the openings/ridges, and by the rapid splitting of the two streams which travel in opposite directions. The turbulence provided by the ridges 17, 24, and 23, the one-hundred-and-eighty-degree reversal of fluid flow, and the very thin sheet by which the fluid flows in the channels because of the shallowness of the channels 12, 18, 26, and 29, ensures that all of the sheet 4 is contacted by the fluid. There is also sufficient turbulence to ensure that all of the fluid will contact the sheet 4.

Further, the channels 12, 18, 26, and 29 have very small internal volumes, so that only a small amount of fluid will purge the entire housing 2. This feature of the invention also ensures that a low volumetric flow rate will result in a high linear velocity perpendicular to the surface of the sheet 4, thereby ensuring, inter alia, that particles will be swept from said surface with a minimum expenditure of fluid. This feature is of particular importance for current technology, in which it is desirable to minimize the quantity of fluid that is spent or not used in an analytical process.

The first plate 6 is constructed in such a manner that the ridges 14, 20, and 28, and the circumference 30 protrude a sufficient distance that, when the first and second plates 6 and 8 are assembled with the sheet 4 therebetween, the ridges 14, 20, and 28 and the raised surface 30 forming the channels 12, 18, 26, and 29 that direct the fluid, are in extremely close proximity to the surface of the sheet 4, but do not touch said surface. It is the surface tension of the liquid that prevents flow under the ridges 14, 20, and 28, and the surface 30, or flow between channels bypassing and flowing under the ridges 14, 20, and 28, and the circumference surface 30. However, even should a small amount of fluid be pushed from channel to channel under the ridges 14, 20, and 28, and under the raised surface 30, this would serve the purpose of bringing the fluid into intimate contact with the membrane. Further, it should be noted that, under normal conditions, the pressure drop between adjacent channels is very small, so that there is very little driving force to urge fluid under the ridges 14, 20, and 28, and under the raised surface 30.

In the preferred embodiment of the present invention, fluid enters through the central opening 10, and makes its way to the outer perimeter by traveling through the channels 12, 18, 26, and 29, where it is then removed from the housing 2 via the peripheral opening 11. One of the phases passes through the sheet 4 via the central opening 34, and is recovered as it leaves the housing 2.

The essence of the present invention is the geometry of the first and second plates 6 and 8, and the manner in which this geometry provides intimate contact of the fluid with the sheet 4, and which ensures that all of the fluid will contact all of the sheet 4; and the shearing action which results when the fluid comes into contact as a very thin layer with and perpendicular to the sheet 4.

In order that suspended particulate matter be removed and separated from a liquid phase or from gas and liquid phases, the velocity of the feed stream across the surface of the sheet 4 should be from about one to about thirty inches per second. Most preferably, said velocity is from about one to about ten inches per second.

I claim:

1. A housing for a sheet of phase-separating material, comprising:

(a) a planar first plate having exterior and interior surfaces; and (b) a planar second plate having exterior and interior surfaces;

the first and second plates being constructed and arranged to hold the sheet between the interior surfaces of the first and second plates in a parallel configuration; the first plate having (c) a circular central first opening extending therethrough; and (d) a peripheral second opening extending through the perimeter of the first plate;

the first plate including an its interior surface a plurality of concentric channels comprising (e) first circular channel concentric with and circumscribing the central opening, the first circular channel comprising a first circular ridge, a second circular ridge, and a third opening which includes the second circular ridge the first circular ridge rising above and being contiguous with the second circular ridge, the second circular ridge and the third opening being disposed between first and second ends of the first circular ridge, the first circular ridge and the second circular ridge in combination defining a complete circle;

(f) a second circular channel concentric with and circumscribing the first circular channel, the second circular channel comprising the first circular ridge, the second circular ridge a third circular ridge, a fourth circular ridge, and a fourth opening which includes the fourth circular ridge, the third circular ridge rising above and being contiguous with the fourth circular ridge, the fourth circular ridge and the fourth opening being disposed between first and second ends of the third circular ridge, the third circular ridge and the fourth circular ridge in combination defining a complete circle, the first circular ridge and the second circular ridge in combination defining the inner boundary of the second circular channel, the third circular ridge and the fourth circular ridge in combination defining the outer boundary of the second circular channel;

(g) a third circular channel concentric with and circumscribing the second circular channel, the third circular channel comprising the third circular ridge, the fourth circular ridge, a fifth circular ridge, a sixth circular ridge, and a fifth opening which includes the sixth circular ridge, the fifth circular ridge rising above and being contiguous with the sixth circular ridge, the sixth circular ridge and the fifth opening being disposed between first and second ends of the fifth circular ridge, the fifth circular ridge and the sixth circular ridge in combination defining a complete circle, the third circular ridge and the fourth circular ridge in combination defining the inner boundary of the third circular channel, the fifth circular ridge and the sixth circular ridge in combination defining the outer boundary of the third circular channel; and (h) a fourth circular channel concentric with and circumscribing the third circular channel, the fourth circular channel comprising the fifth circular ridge the sixth circular ridge, a raised surface, and the peripheral second opening, the raised surface rising above and being contiguous with the lower planar interior surface of the first plate, the fifth circular ridge and the sixth circular ridge in combination defining the inner boundary of the fourth circular channel, the raised surface defining the outer boundary of the fourth circular channel;

the first, third, and fifth circular ridges and the raised surface being higher than the second, fourth, and sixth circular ridges, the second plate having (i) a circular central sixth opening extending therethrough, the central sixth opening in the second plate being coaxial with and juxtaposed to the central first opening the first plate when the first and second plates are assembled to hold the sheet therebetween.

2. The housing of claim 1, wherein the central first opening in the first plate is constructed and arranged to function as an inlet port for a multiphase feed stream, the peripheral second opening in the first plate is constructed and arranged to function as an outlet port for a first phase of the multiphase feed stream, and the central sixth opening in the second plate is constructed and arranged to function as an outlet port for a second phase of the multiphase feed stream.

3. The housing of claim 1, wherein the central first opening in the first plate is constructed and arranged to function as an inlet port for a multiphase feed stream, the peripheral second opening in the first plate is constructed and arranged to function as a bypass port for the multiphase feed stream, and the central sixth opening in the second plate is constructed and arranged to function as an outlet port for one phase of the multiphase feed stream.

4. The housing of claim 1, wherein the peripheral second opening in the first plate is constructed and arranged to function as an inlet port for a multiphase feed stream, the central first opening in the first plate is constructed and arranged to function as an outlet port for a first phase of the multiphase feed stream, and the central sixth opening in the second plate is constructed and arranged to function as an outlet port for a second phase of the multiphase feed stream.

5. The housing of claim 1, wherein the peripheral second opening in the first plate is constructed and arranged to function as an inlet port for a multiphase feed stream, the central first opening in the first plate is constructed and arranged to function as a bypass port for the multiphase feed stream, and the central sixth opening in the second plate is constructed and arranged to function as an outlet port for one phase of the multiphase feed stream.

6. The housing of claim 1, wherein the third, fourth, fifth, and second openings, and the second, fourth, and sixth ridges are disposed at intervals of from about one-hundred-seventy degrees to about one-hundred-ninety degrees around the central first opening in the first plate.

7. The housing of claim 1, wherein the third, fourth, fifth, and second openings, and the second, fourth, and sixth ridges are disposed at intervals of approximately one-hundred-eighty degrees around the central first opening in the first plate.

8. The housing of claim 1, wherein each of the first, second, third, and fourth channels has a width of from about one-tenth to about one-half inch.

9. The housing of claim 1, wherein each of the first, second, third, and fourth channels has a width of from about one-tenth to about one-fourth of an inch.

10. The housing of claim 1, wherein each of the first, second, third, and fourth channels has a width of from about one-tenth to about three-tenths of an inch.

11. The housing of claim 1, wherein each of the first, second, third, and fourth channels has a width of approximately two-tenths of an inch.

12. The housing of claim 1, wherein each of the first, third, and fifth ridges, and the raised surface, have a height of from about one one-hundredth to about twelve one-hundredths of an inch.

13. The housing of claim 1, wherein each of the first, third, and fifth ridges, and the raised surface have a height of from about two one-hundredths to about one-tenth of an inch.

14. The housing of claim 1, wherein each of the first, third, and fifth ridges, and the raised surface have a height of from about three one-hundredths to about nine one-hundredths of an inch.

15. The housing of claim 1, wherein each of the first, third, and fifth ridges, and the raised surface have a height of from about four one-hundredths to about eight-tenths of an inch.

16. The housing of claim 1, wherein each of the first, third, and fifth ridges, and the raised surface have a height of from about five one-hundredths to about seven one-hundredths of an inch.

17. The housing of claim 1, wherein each of the first, third, and fifth ridges, and the raised surface have a height of approximately sixty-three one-thousandths of an inch.

18. The housing of claim 1, wherein each of the second, fourth, and sixth ridges in the areas of each of the third, fourth, and fifth openings has a length of from about one-tenth to about six-tenths of an inch.

19. The housing of claim 1, wherein each of the third, fourth, and fifth openings in the areas of each of the second, fourth and sixth ridges has a length of from about two-tenths to about one-half of an inch.

20. The housing of claim 1, wherein each of the third, fourth, and fifth openings in the areas of each of the second, fourth, and sixth ridges has a length of from about three-tenths to about one-half of an inch.

21. The housing of claim 1, wherein each of the third, fourth, and fifth openings in the areas of each of the second, fourth, and sixth ridges has a length of from about four-tenths to about one-half of an inch.

22. The housing of claim 1, wherein each of the third, fourth, and fifth opening in the areas of each of the second, fourth, and sixth ridges has a length of approximately forty-four one-hundredths of an inch.

23. The housing of claim 1, wherein each of the second, fourth, and sixth ridges has a height of from about five one-thousandths to about five one-hundredths of an inch.

24. The housing of claim 1, wherein each of the second, fourth, and sixth ridges has a height of from about five one-thousandths to about four one-hundredths of an inch.

25. The housing of claim 1, wherein each of the second, fourth, and sixth ridges has a height of from about five one-thousandths to about three one-hundredths of an inch.

26. The housing of claim 1, wherein each of the second, fourth, and sixth ridges has a height of from about five one-thousandths to about two one-hundredths of an inch.

27. The housing of claim 1, wherein each of the second, fourth, and sixth ridges has a height of from about five one-thousandths to about one one-hundredth of an inch.

28. The housing of claim 1, wherein each of the second, fourth, and sixth ridges has a height of approximately nine one-thousandths of an inch.

29. The housing of claim 1, wherein each of the first, third, and fifth ridges defines an arc of from about two-hundred-eighty to about three-hundred-twenty degrees, and each of the second, fourth, and sixth ridges defines an arc of from about forty degrees to about eighty degrees.

30. The housing of claim 1, wherein each of the first, third, and fifth ridges defines an arc of approximately three-hundred degrees, and each of the second, fourth, and sixth ridges defines an arc of approximately sixty degrees.

31. The housing of claim 1, wherein the distance from the sheet to the most elevated area of the interior surface of each of the plates is from about one one-thousandth to about five one-hundredths of an inch.

32. The housing of claim 1, wherein the distance from the sheet to the most elevated area of the interior surface of each of the plates is from about one one-thousandth to about four one-hundredths of an inch.

33. The housing of claim 1, wherein the distance from the sheet to the most elevated area of the interior surface of each of the plates is from about one one-thousandth to about three one-hundredths of an inch.

34. The housing of claim 1, wherein the distance from the sheet to the most elevated area of the interior surface of each of the plates is from about one one-thousandth to about two one-hundredths of an inch.

35. The housing of claim 1, wherein the distance from the sheet to the most elevated area of the interior surface of each of the plates is from about one one-thousandth to about one one-hundredth of an inch.

36. The housing of claim 1, wherein the distance from the sheet to the most elevated area of the interior surface of each of the plates is approximately eighteen one-thousandths of an inch.

* * * * *